(12) United States Patent
Lee

(10) Patent No.: US 10,167,924 B2
(45) Date of Patent: Jan. 1, 2019

(54) CRANKSHAFT HAVING BALANCE WEIGHT

(71) Applicants: HYUNDAI MOTOR COMPANY, Seoul (KR); KIA MOTORS CORPORATION, Seoul (KR)

(72) Inventor: Jae Kwon Lee, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 126 days.

(21) Appl. No.: 15/333,898

(22) Filed: Oct. 25, 2016

(65) Prior Publication Data

US 2017/0254388 A1 Sep. 7, 2017

(30) Foreign Application Priority Data

Mar. 2, 2016 (KR) ........................ 10-2016-0025315

(51) Int. Cl.
| | |
|---|---|
| *F16F 15/28* | (2006.01) |
| *F01B 9/02* | (2006.01) |
| *F02B 75/32* | (2006.01) |
| *F02B 75/22* | (2006.01) |
| *F02B 75/18* | (2006.01) |
| *F01B 1/04* | (2006.01) |
| *F02B 75/06* | (2006.01) |

(52) U.S. Cl.
CPC ............ *F16F 15/283* (2013.01); *F01B 9/026* (2013.01); *F02B 75/32* (2013.01); *F01B 1/04* (2013.01); *F02B 75/06* (2013.01); *F02B 75/22* (2013.01); *F02B 2075/1808* (2013.01)

(58) Field of Classification Search
CPC ......... F16F 15/283; F02B 75/22; F02B 75/32; F01B 9/026
See application file for complete search history.

(56) References Cited

U.S. PATENT DOCUMENTS

| | | | |
|---|---|---|---|
| 2008/0247890 A1 | 10/2008 | Kubota et al. | |
| 2014/0245985 A1* | 9/2014 | Lach ..................... | F16F 15/283 123/192.2 |

FOREIGN PATENT DOCUMENTS

| | | |
|---|---|---|
| JP | 2008-032177 A | 2/2008 |
| JP | 2009-085316 A | 4/2009 |
| JP | 4752241 B2 | 8/2011 |
| KR | 10-2004-0046583 A | 6/2004 |
| KR | 10-2009-0062661 A | 6/2009 |
| WO | 2009-119712 A1 | 10/2009 |

\* cited by examiner

*Primary Examiner* — Jacob Amick
(74) *Attorney, Agent, or Firm* — McDermott Will & Emery LLP

(57) ABSTRACT

A crankshaft having a balance weight, the crankshaft a crank pin eccentric to a rotation axis of the crankshaft, a connecting rod connecting the crank pin and a piston, and a balance weight disposed to be opposite to the crank pin in the crankshaft, wherein the balance weight has radius which is a distance between the rotation axis of a crankshaft and an exterior circumferential surface of the balance weight, and wherein the radius of the balance weight is formed differently depending on a rotation direction of the balance weight.

9 Claims, 3 Drawing Sheets

FIG. 3

| Range | Position | Radius |
|---|---|---|
| S1 | BDC 10° ~ +10° | R1 |
| S2 | BDC -20° ~ -10° (+20° ~ +10°) | R2 |
| S3 | BDC -30° ~ -20° (+30° ~ +20°) | R3 |
| Comparison | R1 < R2 < R3 | |

CRANKSHAFT HAVING BALANCE WEIGHT

CROSS-REFERENCE TO RELATED APPLICATION

This application claims the benefit of priority to Korean Patent Application 10-2016-0025315, filed with the Korean Intellectual Property Office on Mar. 2, 2016, the entire contents of which are incorporated herein by reference.

TECHNICAL FIELD

The present disclosure relates to a crankshaft having a balance weight disposed on the crankshaft of an internal combustion engine performing reciprocal motion to cancel a moment with respect to an explosion force of the internal combustion engine.

BACKGROUND

Generally, a crankshaft is rotatably supported by a main bearing installed in a crank case of an engine, and the crankshaft is a device for changing linear motion of a piston into rotary motion through a connecting rod in the power stroke of each cylinder.

The crankshaft consists of a crank pin, a crank arm, a crank journal, etc. that are integrally formed, and a balance weight is attached to the crank arm in order to maintain a rotational balance.

Since a center of the crank journal is eccentric to a center of the crank pin, the crankshaft does not maintain balance while rotating, and a rotational mass moment and a reciprocal mass moment are generated.

However, since the generated moment is accompanied by a complicated vibration, the balance weight is applied to smoothly operate an engine and to maintain balance of a balance shaft.

Recently, since a distance between the piston and the crankshaft has been shortened and it is necessary to maintain a gap between the piston and the balance weight, an exterior diameter of the balance weight has decreased, thus an entire rotatory balance may deteriorate.

Accordingly, in order to stably maintain the gap between the piston and the balance weight and to normally maintain a function of the balance weight, research on a shape of the balance weight is being carried out.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide a crankshaft having a balance weight that may prevent interference between the balance weight and a piston by maintaining a gap from the piston according to a rotational position of the balance weight and that effectively improves balance-maintaining performance of the balance weight.

That is, the present disclosure has been made in an effort to provide a crankshaft having a balance weight that may stably maintain a rotation balance by decreasing an exterior diameter of the balance weight at a portion corresponding to bottom dead center (BDC) and gradually increasing the exterior diameter of the balance weight at other portions so that a mass center of the balance weight may move to an outer side.

An exemplary embodiment of the present disclosure provides a crankshaft having a balance weight, including: a crankshaft; a crank pin that is eccentric to a rotation axis of the crankshaft; a connecting rod that connects the crank pin and a piston; and a balance weight that is disposed to be opposite to the crank pin in the crankshaft, wherein a BDC line may be formed to pass through the rotation axis of the crankshaft and a central axis of the crank pin, in an exterior circumferential surface of the balance weight, first ranges respectively set in a rotation direction of the balance weight and in a rotation direction opposite to the rotation direction of the balance weight based on the BDC line may be formed to have a first radius from the rotation axis, second ranges respectively set in the rotation direction of the balance weight and in the rotation direction opposite to the rotation direction of the balance weight in the first ranges may be formed to have a second radius from the rotation axis, and the first radius may be shorter than the second radius.

Third ranges respectively set in the rotation direction of the balance weight and in the rotation direction opposite to the rotation direction of the balance weight in the second ranges may be formed to have a third radius from the rotation axis, and the second radius is shorter than the third radius.

The first range, the second range, and the third range may be formed in a portion of the balance weight facing a lower portion of the piston connected thereto through the piston pin at a front end portion of the connecting rod.

Two connecting rods may be connected to one crank pin, the piston may be disposed at each of the two connecting rods, and the two connecting rods may be disposed in a "V"-shape with a predetermined angle based on the crank pin.

The BDC line may vertically cross the rotation axis of the crankshaft and the central axis of the crank pin.

The first range may be included in a range of an angle of negative 10 degrees to an angle of positive 10 degrees of the BDC line, the second range may be included in a range of an angle of negative 20 degrees to an angle of negative 10 degrees of the BDC line and in a range of an angle of positive 10 degrees to an angle of positive 20 degrees of the BDC line, and the third range may be included in a range of an angle of negative 30 degrees to an angle of negative 20 degrees of the BDC line and in a range of an angle of positive 20 degrees to an angle of positive 30 degrees of the BDC line.

Another embodiment of the present disclosure provides an engine having a balance weight, including: a crankshaft; a crank pin that is eccentric to a rotation axis of the crankshaft; a connecting rod that connects the crank pin and a piston; and a balance weight that is disposed to be opposite to the crank pin in the crankshaft, wherein a BDC line may be formed to pass through the rotation axis of the crankshaft and a central axis of the crank pin, in an exterior circumferential surface of the balance weight, first ranges respectively set in a rotation direction of the balance weight and in a rotation direction opposite to the rotation direction of the balance weight based on the BDC line may be formed to have a first radius from the rotation axis, second ranges respectively set in the rotation direction of the balance weight and in the rotation direction opposite to the rotation direction of the balance weight in the first ranges may be formed to have a second radius from the rotation axis, third ranges respectively set in the rotation direction of the balance weight and in the rotation direction opposite to the rotation direction of the balance weight in the second ranges may be formed to have a third radius from the rotation axis, the first radius R1 may be shorter than the second radius R2, and the second radius R2 may be shorter than the third radius R3.

The first range, the second range, and the third range may be formed in a portion of the balance weight facing a lower portion of the piston connected thereto through the piston pin at a front end portion of the connecting rod.

The BDC line may vertically cross the rotation axis of the crankshaft and the central axis of the crank pin.

BRIEF DESCRIPTION OF THE DRAWINGS

FIG. 3 illustrates a feature table for a shape of a balance weight according to an exemplary embodiment of the present disclosure.

DETAILED DESCRIPTION

Figure 1:
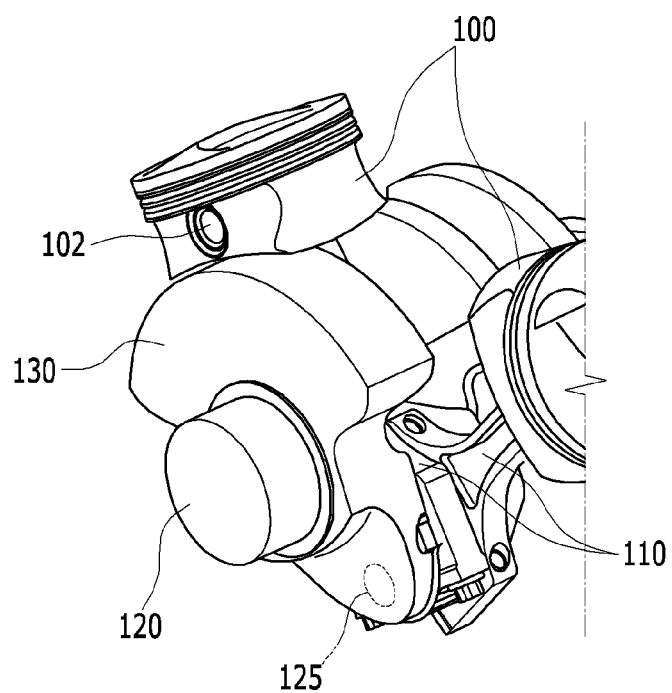
FIG. 1 illustrates a schematic perspective view of a crankshaft having a balance weight according to an exemplary embodiment of the present disclosure.

Hereinafter, an exemplary embodiment of the present disclosure will be described in detail with reference to the accompanying drawings.

However, the size and thickness of each component illustrated in the drawings may be arbitrarily shown for ease of description and the present disclosure is not limited thereto, and the thicknesses of portions and regions may be exaggerated for clarity.

In addition, parts that are irrelevant to the description are omitted to clearly describe the exemplary embodiments of the present disclosure, and like reference numerals designate like elements throughout the specification.

In the following description, dividing names of components into first, second, and the like is to divide the names because the names of the components are the same and an order thereof is not particularly limited.

FIG. 1 illustrates a schematic perspective view of a crankshaft having a balance weight according to an exemplary embodiment of the present disclosure.

Referring to FIG. 1, an engine may include a piston 100, a piston pin 102, a connecting rod 110, a crank pin 125, a balance weight 130 and a crankshaft 120.

The crankshaft 120 is rotatably disposed at, or in, a cylinder block of the engine through a journal bearing, and the crank pin 125 is disposed to be eccentric to a rotation axis of the crankshaft 120 by a predetermined distance.

The balance weight 130 is disposed to be opposite to the crank pin 125 based on a central axis of the crankshaft 120, the balance weight 130 may be formed to have an arc, or an arcuate, shape, and an exterior circumferential surface of the balance weight 130 may face a lower surface of the piston 100.

As shown in FIG. 1, two connecting rods 110 are connected to one crank pin 125, and the piston 100 is respectively disposed at front end portions of the connecting rods 110, thus the size of an entire structure thereof may be reduced by disposing two connecting rods 110 and pistons 100 at one crank pin 125.

In an exemplary embodiment of the present disclosure, the exterior circumferential surface of the balance weight 130 and the piston 100 are maintained with a predetermined gap, and they are formed to have a structure for maintaining a weight of the balance weight 130, thereby improving a function of the balance weight 130 and removing interference between the balance weight 130 and the piston 100.

Figure 2:
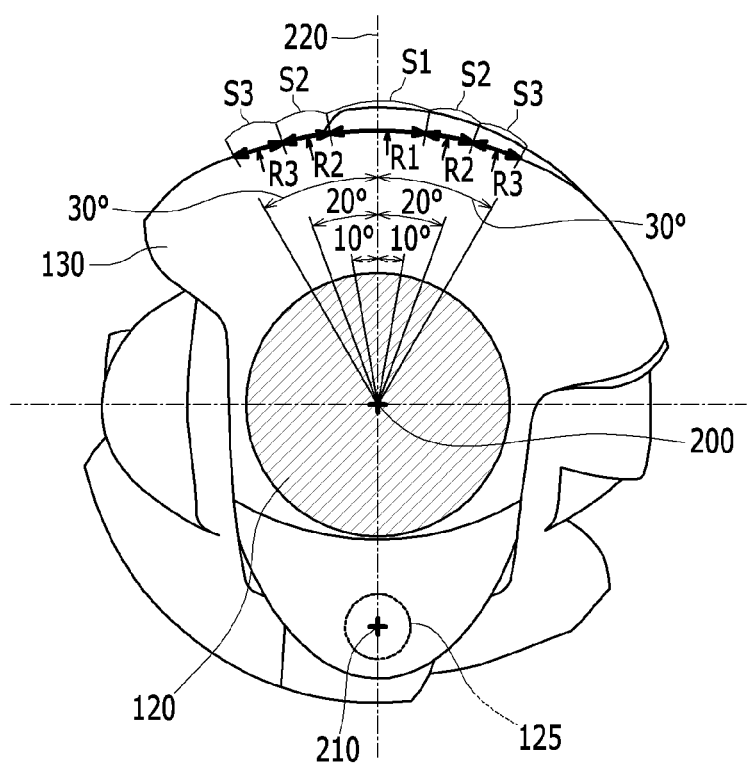
FIG. 2 illustrates a cross-sectional view of one side of a crankshaft having a balance weight according to an exemplary embodiment of the present disclosure.

FIG. 2 illustrates a cross-sectional view of one side of a crankshaft having a balance weight according to an exemplary embodiment of the present disclosure.

Referring to FIG. 2, a rotation axis 200 is provided at a rotation center of the crankshaft 120, and a central axis 210 is provided at a central portion of the crank pin 125 connected to a lower end portion of the connecting rod 110.

Here, the central axis 210 of the crank pin 125 and the rotation axis 200 of the crankshaft 120 may be formed to be parallel to each other. In addition, a BDC line 220 passing through the central axis 210 of the crank pin 125 and the rotation axis 200 of the crankshaft 120 is formed. BDC stands for bottom dead center.

The rotation axis 200 of the crankshaft 120 and the central axis 210 of the crank pin 125 may be formed to be parallel to each other, and the BDC line 220 is set to vertically cross the rotation axis 200 of the crankshaft 120 and the central axis 210 of the crank pin 125.

A first range S1, a second range S2 and a third range S3 are set on the exterior circumferential surface of the balance weight 130 based on the BDC line 220.

The first range S1 includes ranges respectively set in a rotation direction of the balance weight 130 and in a rotation direction opposite to the rotation direction of the balance weight 130, based on the BDC line 220. That is, the first range S1 includes a range of an angle from negative 10 degrees to an angle of positive 10 degrees based on the BDC line 220.

The second range S2 includes ranges respectively set in the rotation direction of the balance weight 130 and in the rotation direction opposite to the rotation direction of the balance weight 130, in the first range S1. That is, the second range S2 includes a range of an angle from negative 20 degrees to an angle of negative 10 degrees and a range of an angle from positive 10 degrees to an angle of positive 20 degrees, based on the BDC line 220.

The third range S3 includes ranges respectively set in the rotation direction of the balance weight 130 and in the rotation direction opposite to the rotation direction of the balance weight 130, in the second range S2. That is, the third range S3 includes a range of an angle from negative 30 degrees to an angle of negative 20 degrees and a range of an angle from positive 20 degrees to an angle of positive 30 degrees, based on the BDC line 220.

In an exemplary embodiment of the present disclosure, the first range S1 is formed to have a first radius R1 from the rotation axis 200 of the crankshaft 120, the second range S2 is formed to have a second radius R2 from the rotation axis 200 of the crankshaft 120, and the third range S3 is formed to have a third radius R3 from the rotation axis 200 of the crankshaft 120.

Generally, an interval between the piston 100 and the balance weight 130 is reduced in a range between angles from about 10 degrees at front and rear sides of the BDC line 220. In an exemplary embodiment of the present disclosure, it is possible to stably maintain the rotation balance by decreasing an exterior diameter of the balance weight 130 in the range corresponding to the BDC line 220 and increasing the exterior diameter of the balance weight 130 in the other ranges.

FIG. 3 illustrates a feature table for a shape of a balance weight according to an exemplary embodiment of the present disclosure.

Referring to FIG. 3, the first range S1 is included in a range from an angle of negative 10 degrees to an angle of positive 10 degrees of the BDC line 220, and the exterior diameter of the balance weight 130 corresponding to the first range S1 indicates R1.

The second range S2 is included in a range of an angle from negative 20 degrees to an angle of negative 10 degrees of the BDC line 220 and in a range of an angle of positive 10 degrees to an angle of positive 20 degrees of the BDC line 220, and the exterior diameter of the balance weight 130 corresponding to the second range S2 indicates R2.

The third range S3 is included in a range from an angle of negative 30 degrees to an angle of negative 20 degrees of the BDC line 220 and in a range of an angle of positive 20 degrees to an angle of positive 30 degrees of the BDC line 220, and the exterior diameter of the balance weight 130 corresponding to the third range S3 indicates R3.

As described above, when the piston 100 is positioned at the BDC line 220, the balance weight 130 is close to the balance weigh 130. In this case, if an appropriate radius of the balance weight 130 is not set, the balance weight 130 may collide with a lower portion of the piston 100.

However, in an exemplary embodiment of the present disclosure, the R1 is shorter than the R2, and the R2 is shorter than the R3. That is, a relationship of R1<R2<R3 is satisfied. Accordingly, it is possible to stably maintain the rotation balance by decreasing the exterior diameter of the balance weight in the range corresponding to the BDC and gradually increasing the exterior diameter of the balance weight in the other ranges so that the mass center of the balance weight 130 may move to the outer side.

As a result, it is possible to prevent the interference between the balance weight 130 and the piston 100 by maintaining the gap from the piston 100 according to the rotational position of the balance weight 130 and to effectively improve the balance-maintaining performance of the balance weight 130.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A crankshaft having a balance weight, the crankshaft comprising:
   a crank pin eccentric to a rotation axis of the crankshaft;
   a connecting rod connecting the crank pin and a piston; and
   the balance weight disposed to be opposite to the crank pin in the crankshaft,
   wherein the balance weight has a radius which is a distance between the rotation axis of the crankshaft and an exterior circumferential surface of the balance weight,
   wherein the radius of the balance weight is formed differently depending on a rotation direction of the balance weight,
   wherein a Bottom Dead Center (BDC) line is formed to pass through the rotation axis of the crankshaft and a central axis of the crank pin,
   wherein, in the exterior circumferential surface of the balance weight, first ranges respectively set in a rotation direction of the balance weight and in a rotation direction opposite to the rotation direction of the balance weight based on the BDC line are formed to have a first radius from the rotation axis,
   second ranges respectively set in the rotation direction of the balance weight and in the rotation direction opposite to the rotation direction of the balance weight in the first ranges are formed to have a second radius from the rotation axis, and
   the first radius being shorter than the second radius.

2. The crankshaft having the balance weight of claim 1, wherein
   third ranges respectively set in the rotation direction of the balance weight and in the rotation direction opposite to the rotation direction of the balance weight in the second ranges are formed to have a third radius from the rotation axis, and
   the second radius being shorter than the third radius.

3. The crankshaft having the balance weight of claim 2, wherein
   the first range, the second range, and the third range are formed in a portion of the balance weight facing a lower portion of the piston connected thereto through the piston pin at a front end portion of the connecting rod.

4. The crankshaft having the balance weight of claim 2, wherein:
   two connecting rods are connected to one crank pin,
   the piston is disposed at each of the two connecting rods, and
   the two connecting rods are disposed in a "V"-shape with a predetermined angle based on the crank pin.

5. The crankshaft having the balance weight of claim 4, wherein
   the BDC line vertically crosses the rotation axis of the crankshaft and the central axis of the crank pin.

6. The crankshaft having the balance weight of claim 2, wherein
   the first range is included in a range from an angle of negative 10 degrees to an angle of positive 10 degrees of the BDC line,
   the second range is included in a range from an angle of negative 20 degrees to an angle of negative 10 degrees of the BDC line and in a range of an angle from positive 10 degrees to an angle of positive 20 degrees of the BDC line, and
   the third range is included in a range from an angle of negative 30 degrees to an angle of negative 20 degrees of the BDC line and in a range from an angle of positive 20 degrees to an angle of positive 30 degrees of the BDC line.

7. An engine having a balance weight, the engine comprising:
   a crank pin eccentric to a rotation axis of a crankshaft;
   a connecting rod connecting the crank pin and a piston; and
   a balance weight disposed to be opposite to the crank pin in the crankshaft,
   wherein a Bottom Dead Center (BDC) line is formed to pass through the rotation axis of the crankshaft and a central axis of the crank pin,
   wherein in an exterior circumferential surface of the balance weight,
   first ranges respectively set in a rotation direction of the balance weight and in a rotation direction opposite to the rotation direction of the balance weight based on the BDC line are formed to have a first radius from the rotation axis, second ranges respectively set in the rotation direction of the balance weight and in the rotation direction opposite to the rotation direction of the balance weight in the first ranges are formed to have a second radius from the rotation axis, third ranges respectively set in the rotation direction of the balance weight and in the rotation direction opposite to the rotation direction of the balance weight in the second ranges are formed to have a third radius from the rotation axis, the first radius R1 being shorter than the second radius R2, and the second radius R2 being shorter than the third radius R3.

8. The engine having the balance weight of claim 7, wherein
the first range, the second range, and the third range are formed in a portion of the balance weight facing a lower portion of the piston connected thereto through the piston pin at a front end portion of the connecting rod.

9. The engine having the balance weight of claim 7, wherein
the BDC line vertically crosses the rotation axis of the crankshaft and the central axis of the crank pin.

* * * * *